United States Patent [19]

Meyer et al.

[11] Patent Number: 4,998,707

[45] Date of Patent: Mar. 12, 1991

[54] EXHAUST GAS RECIRCULATION VALVE ASSEMBLY

[75] Inventors: Karen M. Meyer, Avon; Michael D. Liggett, Rochester; Robert J. Conklin, Rochester; Charles J. Barker, Rochester, all of N.Y.

[73] Assignee: General Motors Corporation, Detroit, Mich.

[21] Appl. No.: 538,045

[22] Filed: Jun. 13, 1990

[51] Int. Cl.[5] ...................... F16K 31/06; F16K 41/00; F16K 49/00

[52] U.S. Cl. ................................ 251/129.15; 251/337; 251/214; 123/571; 137/340

[58] Field of Search .................... 251/129.15, 337, 214; 123/571; 137/340

[56] References Cited

U.S. PATENT DOCUMENTS

| | | | |
|---|---|---|---|
| 4,611,632 | 9/1986 | Kolchinsky | 251/129.5 X |
| 4,694,812 | 9/1987 | Wendt | 123/571 |
| 4,725,040 | 2/1988 | Fornuto et al. | 251/129.15 |
| 4,749,167 | 6/1988 | Gottschall | 251/337 X |
| 4,782,811 | 11/1988 | Hewette et al. | 123/571 |
| 4,805,582 | 2/1989 | Braun et al. | 123/568 |

*Primary Examiner*—Arnold Rosenthal
*Attorney, Agent, or Firm*—Karl F. Barr, Jr.

[57] ABSTRACT

An exhaust gas recirculation valve assembly for controlling the recirculation of exhaust gas in an internal combustion engine has an electrically operated valve member that meters flow of exhaust gas through an exhaust gas chamber. A valve member has a valve stem extending to an actuator which is isolated from the base housing the exhaust gas, and the valve is surrounded by a pair of spring-biased seals that seal openings around the valve stem into the actuator and the exhaust gas chamber. The seal closing the actuator opening has an inverted, cup-shaped configuration which encloses the valve stem between the actuator and the base thereby preventing impingement thereon of contaminants which could be carried into the actuator.

8 Claims, 1 Drawing Sheet

EXHAUST GAS RECIRCULATION VALVE ASSEMBLY

BACKGROUND OF THE INVENTION

1. Field of the Invention

The present invention relates to an exhaust gas recirculation valve assembly for controlling recirculation of exhaust gas in an internal combustion engine and, more particularly, to an exhaust gas recirculation valve assembly having valve stem seals configured to protect the shaft-seal interface from contamination.

2. Description of the Relevant Art

Electrically actuated exhaust gas recirculation (EGR) valve assemblies generally require isolation of the actuator assembly from the exhaust gas to assure proper operation. Separation of the actuator from the base comes the need to prevent contamination, by foreign substances present in the engine compartment environment, of the actuator and the valve stem, which extends between the two components. Electrically actuated EGR assemblies heretofore proposed utilize a pair of spring-biased, disc-shaped seals around the openings where the valve stem enters the actuator, and the exhaust gas chamber. This configuration allows lateral movement of the seal to compensate for potential misalignment between the solenoid coil and the base. Such a configuration provides minimal protection to the valve stem which extends between the actuator and the base cover.

SUMMARY OF THE INVENTION

The present invention provides an electrically actuated EGR valve assembly having an actuator seal configured to protect the valve stem and stem-seal interface from contamination while allowing lateral movement of the seal and preventing heat build-up within the seal. In a preferred embodiment of an EGR valve embodying this invention, a valve member controls the flow of exhaust gas from an exhaust gas chamber member. An actuator, such as a solenoid coil, is located outside the chamber and is operatively connected with the valve member through a valve stem extending therebetween. The valve stem is surrounded by a pair of spring-biased seals that close the openings around the valve stem where it enters the actuator and the exhaust gas chamber. The seal around the actuator opening has an inverted cup configuration which comprises a central portion with an integral spring seat, a raised peripheral portion which engages the lower surface of the actuator to seal the opening therein, and a downwardly extending skirt portion which extends to a location slightly above the base seal to shield the valve stem from impingement of contaminants present in the engine environment. Ventilation apertures extend circumferentially about the downwardly extending sides to prevent heat build-up within the enclosed seal while providing a high degree of protection to the shaft.

Other objects and features of the invention will become apparent by reference to the following description and to the drawing.

DESCRIPTION OF THE PREFERRED EMBODIMENT

Figure 1:
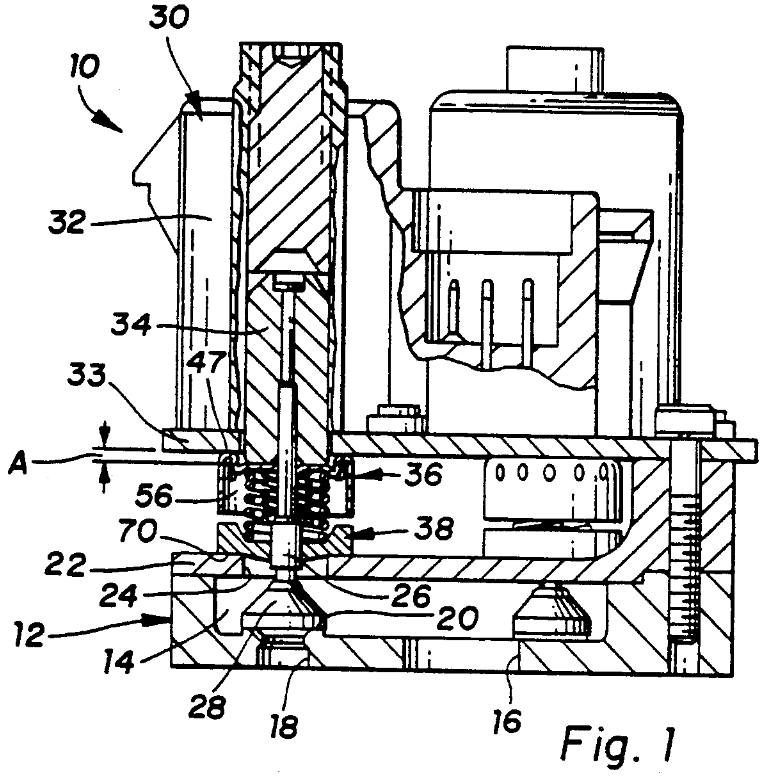
FIG. 1 is a sectional view of an exhaust gas recirculation valve assembly embodying the present invention.

In FIG. 1 there is shown an exhaust gas recirculation valve assembly, designated generally as 10, for controlling the recirculation of exhaust gas in an internal combustion engine. The valve assembly 10 has a base 12 with an exhaust chamber 14, an inlet and an outlet opening, 16 and 18 respectively, and a valve seat 20 formed about the circumference of the outlet opening 18. In an alternative embodiment, the valve seat may extend about the circumference of inlet opening 16. As shown in FIG. 1, a plurality of inlet and outlet openings may be provided depending on the type and application of the valve 10, however, for purposes of description, one inlet opening 16 and one outlet opening 18 will be described.

A cover 22 having an opening 24, which is generally aligned with the valve seat 20, closes chamber 14. A valve stem 26, having a valve member 28 mounted at a first end thereof, extends through cover opening 24 with valve member 28 mounted adjacent valve seat 20.

An actuator assembly, designated generally as 30, is mounted in spaced relationship to base 12. The actuator assembly 30 comprises a solenoid coil 32 mounted on a bracket 33 in general alignment with valve seat 20. The solenoid coil 32 surrounds an armature 34 which is operatively attached to the second end of valve stem 26.

Figure 2:
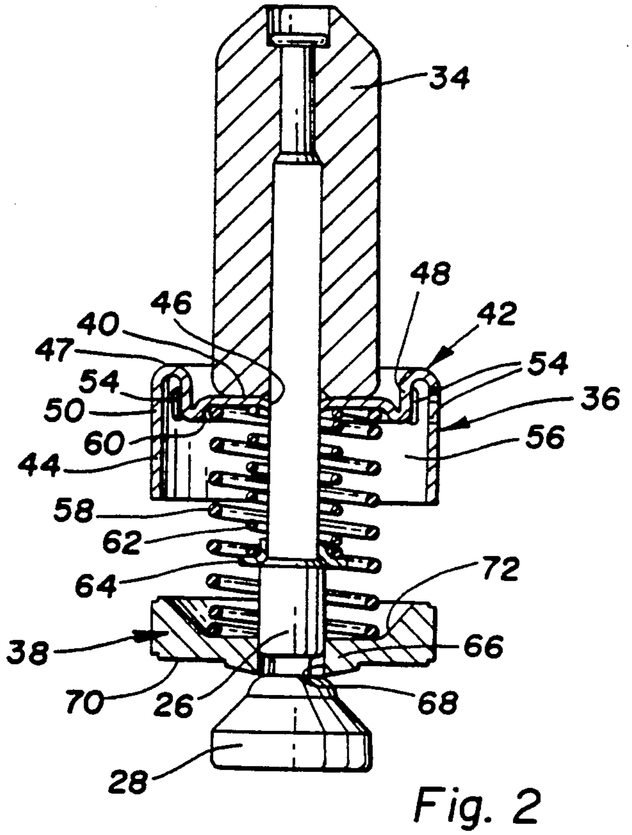
FIG. 2 is an enlarged view of the armature-valve member-seal assembly disposed in the exhaust gas recirculation valve assembly of FIG. 1.

A pair of seals 36 and 38 surround valve stem 26. Upper seal 36 has an inverted, cup-shaped configuration as shown in FIG. 2, with a central disc portion 40, a raised peripheral portion 42 extending about the circumference of the disc portion 40, and a skirt portion 44 extending downwardly from the peripheral portion 42 to a position above lower seal 38. Upper seal 36 is formed from stainless steel sheet, or other suitable material. The disc portion 40 has a centrally located aperture 46 through which valve stem 26 passes. The edge of aperture 46 has a slight downward angle which increases resistance to water penetration at the valve stem-seal interface. The raised peripheral portion 42 has an inverted U-shaped configuration which forms a sealing surface 47, and inner and outer leg portions 48 and 50 respectively. The sealing surface 47 engages the lower surface of actuator assembly 30, see FIG. 1, to prevent intrusion of contaminants into the actuator where they could degrade performance of the unit. Extending downwardly from outer leg 50 is skirt 44. The skirt 44 is integral with outer leg 50 and, as shown in FIG. 1, has an axial length which provides a clearance between the lower edge of the skirt and lower seal 38. Only enough clearance is provided for proper operation of lower seal 38.

Upper seal 36 substantially encloses valve stem 26, between actuator assembly 30 and base 12, within seal chamber 56, to prevent impingement of contaminants thereon. As a result, such contaminants are not carried by the valve stem into the actuator.

Because of the enclosure of the valve stem 26 it is necessary to provide a means for preventing heat build-up within the seal chamber 56. As a result, a plurality of circumferentially spaced ventilation apertures 54 are formed in outer leg 50 of raised peripheral portion 42. The apertures allow heat to escape from seal chamber 56, however, since the apertures are positioned in opposition to inner leg 48, any contamination entering seal chamber 56 through the apertures 54 is deflected by inner leg 48, avoiding direct impingement onto valve stem 26.

Lower seal 38 has a central disc portion 66 with a centrally located aperture 68 surrounding valve stem 26, and a peripheral rim 70 which engages cover 22 to seal the exhaust chamber opening 24.

To maintain upper and lower seals 36, 38 in their respective positions relative to actuator assembly 30 and base 12, a spring 58 extends between an integrally formed spring seat 60 in the lower face of the central disc portion 40 of upper seal 36 and a corresponding spring seat 72 formed in the upper surface of lower seal 38. The force of spring 58 maintains sealing surface 47 of raised peripheral portion 42 in engagement with the lower surface of actuator assembly 30 and the peripheral rim 70 of lower seal 38 in engagement with the upper surface of cover 22. A second, valve return spring 62 extends between spring seat 60 and valve stem spring seat 64 disposed axially midway of the upper and lower seals 36, 38. In operation, spring 62 biases valve stem 26 to engage valve member 28 with valve seat 20. When the solenoid coil 32 is energized, armature 34 and its associated valve stem 26 are lifted, against the bias of spring 62, disengaging valve member 28 from valve seat 20 to allow recirculation of exhaust gas.

It should be noted that solenoid coil 32 may not be precisely in alignment with valve seat 20. In this invention, however, the armature-valve member-seal subassembly, shown in FIG. 2, is able to float laterally to compensate for potential misalignment of the solenoid coil 32 while assuring that the actuator opening remains sealed.

It will be appreciated that besides providing a means for sealing the interior of actuator assembly 30 from contamination, raised peripheral portion 42, of upper seal 36, effectively creates a clearance 'A', see FIG. 1, between the lower face of actuator assembly 30 and the central disc portion 40 of seal 36. The result is an increase in potential armature travel and, consequently, valve travel.

The present invention provides an efficient solution to undesirable contamination of the valve stem and actuator assembly in electrically actuated EGR valves having an electrical actuator which is isolated from the base assembly. The upper seal of the disclosed EGR valve assembly is configured to substantially enclose the valve stem as it extends between the actuator and the valve base with means for preventing undesirable temperature build-up within the enclosure.

Furthermore, the present invention includes a feature which increases the length of armature travel while allowing for lateral movement of the armature-valve member-seal sub-assembly relative to the solenoid coil while maintaining an adequate seal.

Also, the construction of the upper valve seal of the present invention, which uses stainless steel sheet or other suitable material, allows for the inclusion of an integral spring seat in the lower surface of the central disc portion.

While certain embodiments of the invention have been described in detail above in relation to an exhaust gas recirculation valve assembly, it would be apparent to those skilled in the art that the disclosed embodiment may be modified. Therefore the foregoing description is to be considered exemplary, rather than limiting, and the true scope of the invention is that described in the following claims.

The embodiments of the invention in which an exclusive property or privilege is claimed are defined as follows:

1. An exhaust gas recirculation valve assembly comprising:

a base having a valve member disposed therein for controlling exhaust gas flow therethrough, an actuator mounted in spaced relationship to said base, and a valve stem extending between said actuator and said valve member, said actuator energizable to operate said valve stem and valve member in said base an actuator seal, disposed between said actuator and said base, having a generally inverted, cup-shaped configuration, with a central disc portion having an aperture through which said valve stem extends, a raised peripheral seal portion extending about the circumference of said disc portion, a skirt portion extending downwardly from said peripheral seal portion to a position above said base to enclose said valve stem and, an aperture in said skirt to promote air circulation through said seal;

means for biasing said actuator seal upwardly to engage said peripheral seal portion with said actuator thereby enclosing the interface between said actuator and said valve stem to reduce impingement of contaminants thereon while permitting lateral movement of said valve stem relative to said actuator.

2. An exhaust gas recirculation valve assembly, as defined in claim 1, wherein said raised peripheral seal portion has an inverted U-shaped cross section, having radially inner and outer leg portions;

said outer leg portion integral with said skirt and having said ventilation apertures formed therethrough in opposition to said inner leg portion which operates as a barrier between said apertures and said valve stem to prevent contaminants entering said apertures from direct impingement on said valve stem.

3. An exhaust gas recirculation valve assembly, as defined in claim 1, wherein said biasing means comprises a spring surrounding said valve stem.

4. An exhaust gas recirculation valve assembly, as defined in claim 3, having an integral spring seat formed in the lower surface of said central disc portion comprising a downwardly extending annular portion.

5. An exhaust gas recirculation valve assembly comprising:

a base having an exhaust gas chamber with an inlet opening, an outlet opening, and a valve seat surrounding one of said openings;

a cover closing said chamber having an opening generally aligned with said valve seat;

a valve stem extending through said cover opening:

a valve member mounted adjacent said valve seat at one end of said valve stem;

an actuator at the outer end of said valve stem, in spaced relationship to said base, said actuator energizable to operate said valve stem and said valve member into and out of engagement with said valve seat;

an actuator seal surrounding said valve stem and disposed between said actuator and said cover having a generally inverted, cup-shaped configuration, said actuator seal comprising a central disc portion having an aperture through which said valve stem extends, a raised peripheral seal portion extending about the circumference of said disc portion, and a skirt portion extending downwardly from said peripheral seal portion to a position above said cover, said skirt comprising a plurality of circumferentially spaced ventilation apertures;

biasing means disposed between said actuator seal and said cover to bias said peripheral seal portion into engagement with said actuator to seal the interface between said actuator and said valve stem, while permitting lateral movement of said valve stem relative to said actuator.

6. An exhaust gas recirculation valve assembly, as defined in claim 5, wherein said raised peripheral seal portion has an inverted U-shaped cross section having radially inner and outer leg portions;

said outer leg portion integral with said skirt and having said ventilation apertures formed therethrough in opposition to said inner leg portion which operates as a barrier between said apertures and said valve stem to prevent contaminants entering said apertures from direct impingement on said valve stem.

7. An exhaust gas recirculation valve assembly, as defined in claim 5, wherein said biasing means comprises a spring surrounding said valve seal.

8. An exhaust gas recirculation valve assembly, as defined in claim 7, having an integral spring seat formed in the lower surface of said central disc portion comprising a downwardly extending annular portion.

* * * * *